March 16, 1943.　　　B. P. JOYCE　　　2,313,877
WHEELED VEHICLE
Filed July 28, 1939　　　5 Sheets-Sheet 3
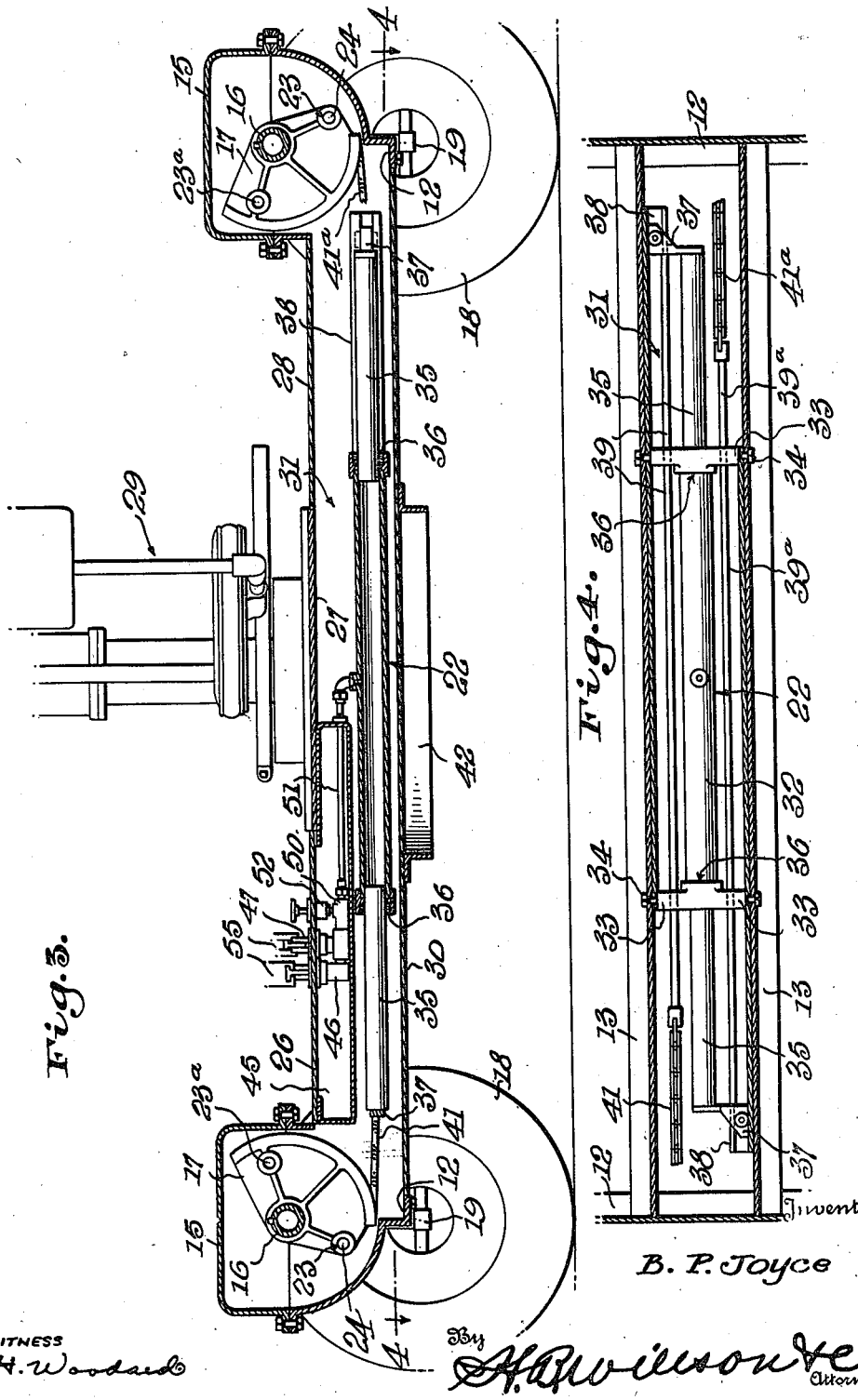
Inventor
B. P. Joyce
WITNESS
H. Woodard
By H. A. Wilson & Co.
Attorneys March 16, 1943.  B. P. JOYCE  2,313,877
WHEELED VEHICLE
Filed July 28, 1939   5 Sheets-Sheet 4
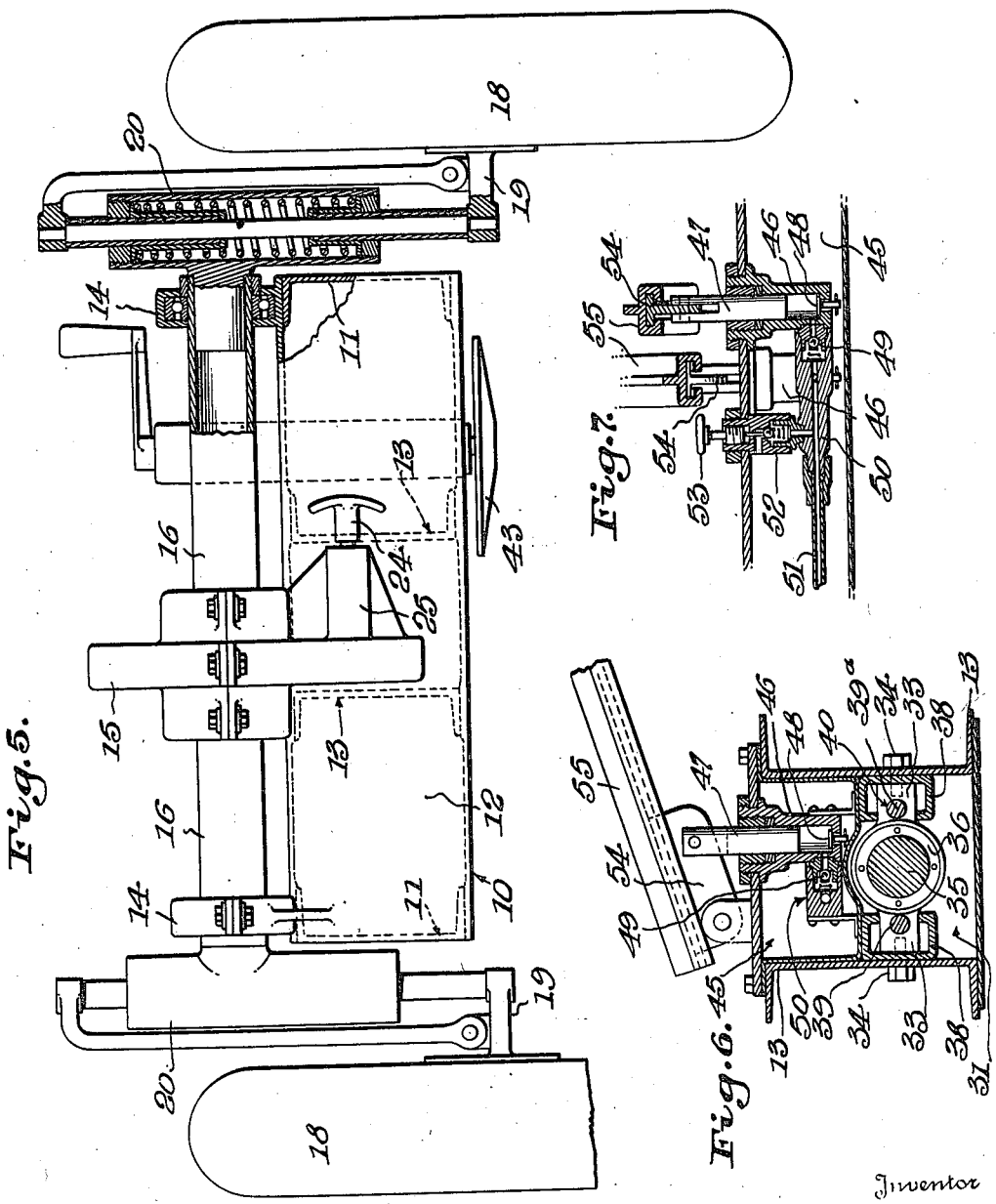
Inventor
B. P. Joyce

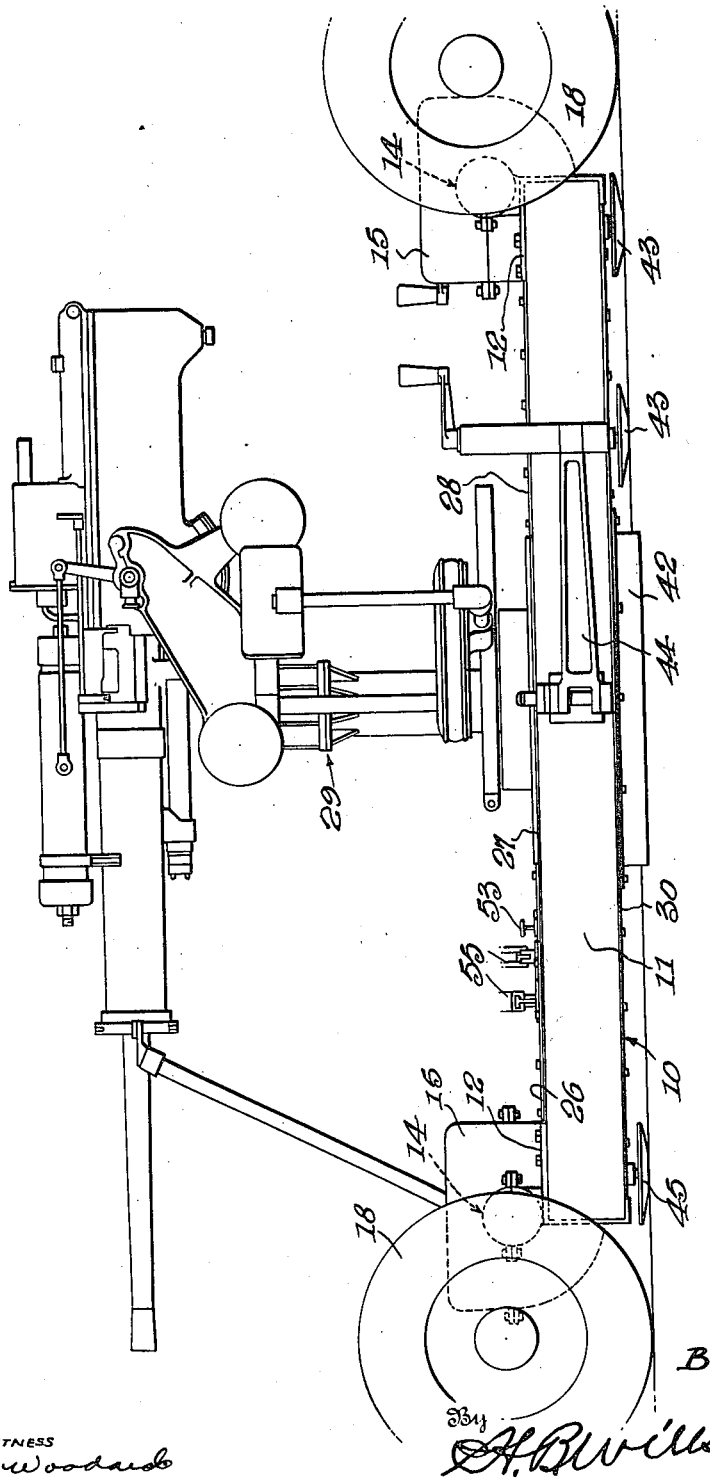

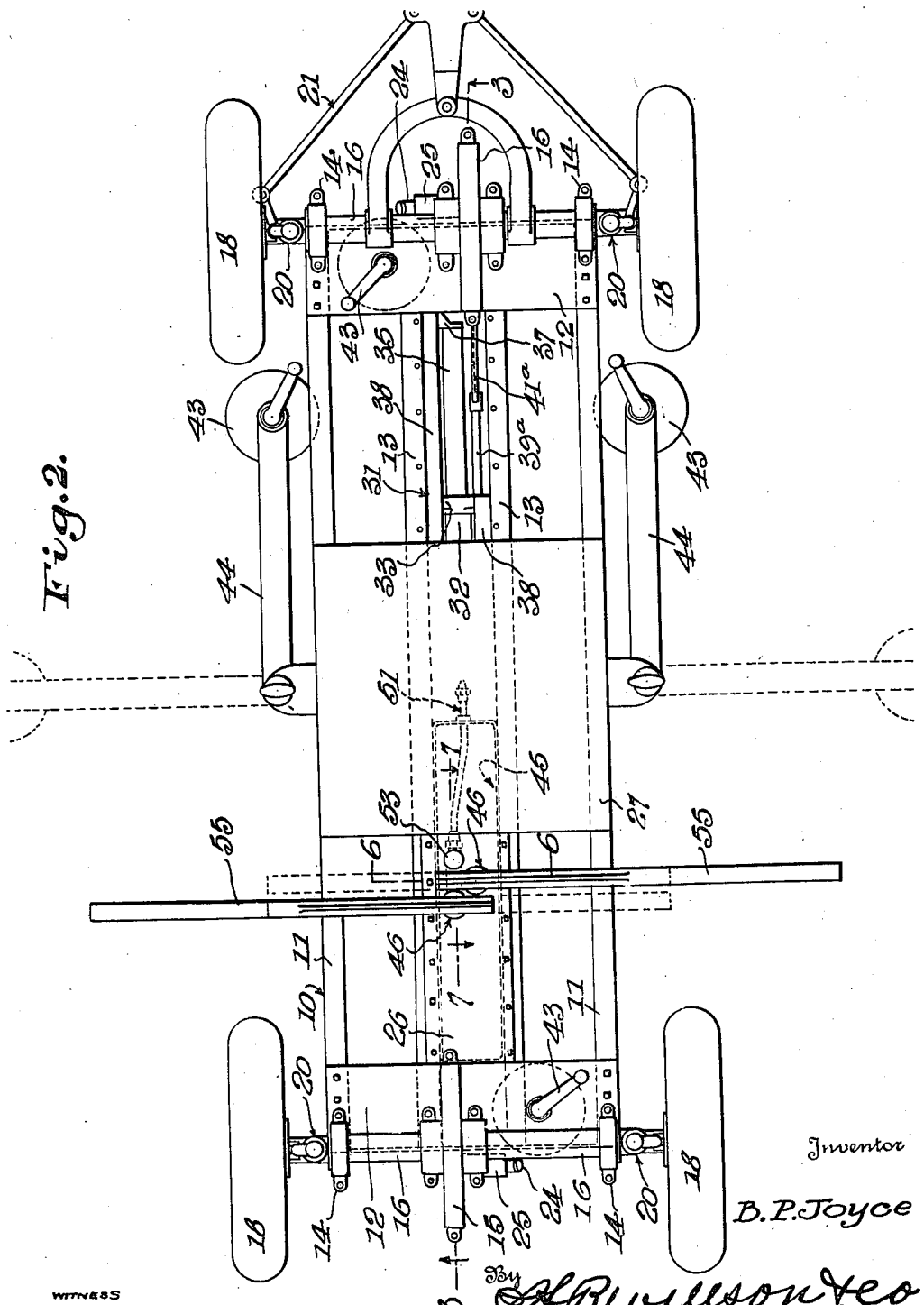

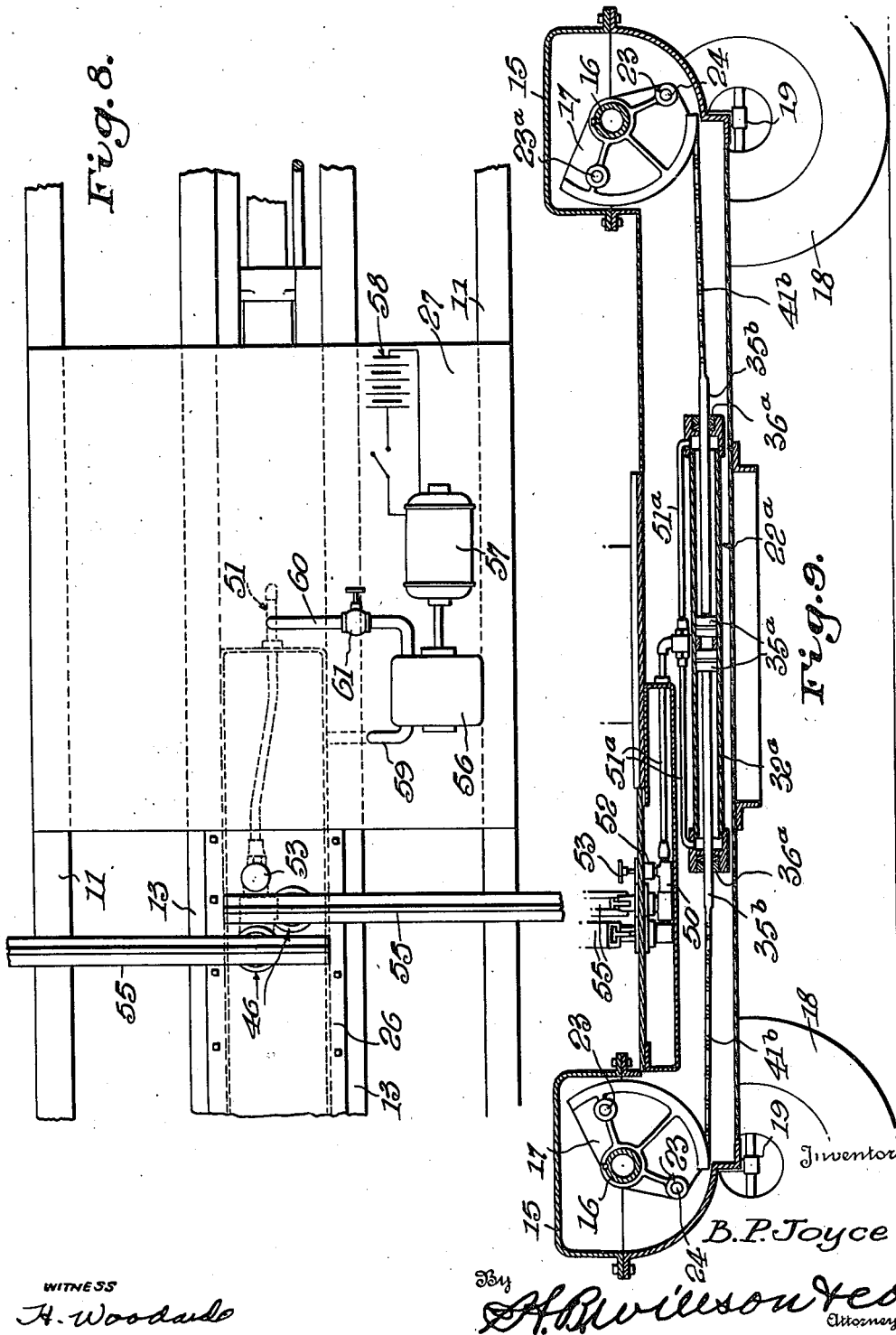

Patented Mar. 16, 1943

2,313,877

UNITED STATES PATENT OFFICE 2,313,877

WHEELED VEHICLE

Bryan P. Joyce, East Orange, N. J., assignor to American Armament Corporation, New York, N. Y., a corporation of Delaware Application July 28, 1939, Serial No. 287,167

13 Claims. (Cl. 89—40)

The invention relates to a new and improved land vehicle designed primarily for use as a readily mobile carriage for ordnance, principally for anti-aircraft guns.

The principal object of the invention is to provide an improved vehicle, the frame of which may be readily lowered onto the ground for gun firing, or may be elevated above the ground to be readily movable from one point to another.

In carrying out the above end, further objects are to provide novel hydraulic mechanism for raising the frame and for permitting rapid lowering thereof whenever required, and to mount said hydraulic means in a well protected manner.

A still further object is to provide a construction which is rather simple and relatively inexpensive, yet efficient, desirable and durable.

With the foregoing and minor objects in view, the invention resides in the novel subject matter hereinafter described and claimed, description being accomplished by reference to the accompanying drawings.

Figure 1 is a side elevation showing the vehicle used as a mobile carriage for an anti-aircraft gun, the vehicle frame being lowered onto the ground for gun firing.

Figure 2 is a top plan view.

Figure 3 is a longitudinal sectional view substantially on line 3—3 of Fig. 2.

Figure 4 is a horizontal sectional view on line 4—4 of Fig. 3.

Figure 5 is a rear elevation partly broken away and in section.

Figures 6 and 7 are detail vertical sectional views on lines 6—6 and 7—7 of Figure 2, showing more particularly the hand pumps and associated means for actuating the hydraulic frame raising and lowering means.

Figure 8 is a fragmentary top plan illustrating a motor driven liquid pump which may be associated with the hydraulic means if desired.

Figure 9 is a view similar to Fig. 3 but illustrating a different cylinder-and-piston-assembly for the hydraulic frame raising and lowering means.

Preferred features of construction have been illustrated and will be rather specifically described, with the understanding, however, that within the scope of the invention as claimed, numerous variations may be made.

The frame 10 of the vehicle is of horizontally elongated form and includes two longitudinal side bars 11 rigidly secured at their ends to transverse end members 12. Two rather closely spaced longitudinal bars 13 are positioned between the side bars 11 at opposite sides of the longitudinal center of the frame, said bars 13 being also rigidly secured to the end members 12, said bars 13 not only serving to strengthen the frame but acting also as mounting and protecting means for various portions of the hydraulic raising and lowering mechanism hereinafter described.

The ends of the end members 12 are provided with alined bearings 14, the lower halves of which may well be integral with said end members. The intermediate portions of these end members are provided with segment casings 15 and the lower portions of these casings may also be integral with said end members if desired. Suitable axles 16 are rotatably mounted in the bearings 14 and extend across the segment casings 15, said axles being provided with segments 17 within said casings. The ends of the axles 16 are provided with supporting wheels 18 mounted on spindles 19, the axes of these spindles being so offset from the axes of the axles 16 that turning of these axles in one manner will permit the frame 10 to lower onto the ground, and turning of said axles in the reverse manner will effect raising of said frame. All of the spindles 19 are yieldably connected with the ends of the axles 16 by any appropriate shock-absorbing mechanisms 20 (see Fig. 5), and any desired provision 21 is made for steering the front wheels.

A hydraulic cylinder-and-piston-assembly 22 (in most views) or 22ª (Fig. 9) is mounted longitudinally between and protected by the inner frame bars 13, said assembly being so connected with the segments 17 as to turn the latter in frame-raising direction and to permit turning of said segments in frame-lowering direction. Each segment is provided with an opening 23 to receive a locking pin 24 (Figs. 3 and 5) to lock the axles in frame-raised position, the pins being slidable in suitable bosses 25 carried by the segment casings 15. Each segment 17 may also be provided with other openings 23ª to receive the pin 24 to lock the axles in frame-lowered position, if desired.

Horizontal plates 26, 27 and 28 are secured upon the upper edges of the longitudinal frame bars 13, said plate 27 being preferably of such size as to extend also to the side bars 11, acting as a supporting deck plate for an anti-aircraft or other gun, illustrated in a general way at 29. One or more additional plates 30 is/are secured to the lower edges of the frame bars 13, the various plates 26, 27, 28 and 30 cooperating with said bars 13 in forming an elongated casing or tunnel 31 in which the cylinder-and-piston-assembly 22 or 22ª is housed and protected, the ends of said tunnel being in communication with the segment casings 15 as shown in Figs. 3 and 9.

In most views, the cylinder-and-piston-assembly 22 has the ends of its cylinder 32 provided with lateral supporting lugs 33 which are secured at 34 to the frame bars 13. The pistons 35 of this assembly project beyond the ends of the cylinder 32, through suitable stuffing boxes 36, and the outer extremities of said pistons are provided with lateral guide heads 37. These heads are slidably engaged with channeled guide tracks 38 secured against the inner sides of the frame bars 13. Two longitudinal pull rods 39 and 39ª are disposed between the cylinder 32 and the bars 13 and pass slidably through guide openings 40 in the lateral lugs 33 of said cylinder. The front end of the rod 39 is connected with the guide head 37 of the foremost of the pistons 35, and the rear end of this rod is secured to a chain or other flexible member 41 which is fastened at its rear end to the segment 17 of the rear axle. The rear end of the pull rod 39ª is secured to the guide head 37 of the rearmost of the pistons 35, and the front end of this rod 39ª is connected by a chain or the like 41ª with the segment 17 on the front axle. When the frame 10 is in the lowered position shown in Fig. 1, the pistons 35 occupy inward positions in closely spaced relation with each other, and when liquid is forced into the cylinder 22 between said pistons, they will be forced outwardly as seen in Fig. 3, thus pulling upon the rods 39 and 39ª and the chains 41 and 41ª, to so turn the axles 16 as to raise said frame 10 from the ground, it being obvious from the drawings that the connections between the ends of the axles and the wheels 18, then serve as cranks. The wheels and frame are locked in proper relative positions for movement of the vehicle, by means of the pins 24. Whenever the frame is to be lowered onto the ground, these pins are withdrawn from the openings 23, permitting the wheels to roll outwardly and allowing the frame to lower. The bottom of the frame is preferably provided with a suitable spade 42 to engage the ground, and leveling jacks 43 may be provided at any desired locations, two of these jacks being preferably mounted on pivoted arms 44 which may be swung laterally from the frame as will be clear from Fig. 2.

A reservoir 45, to contain the piston-actuating liquid, is mounted within and protected by the casing or tunnel 31. Within this reservoir and secured to the top plate 26 thereof are two vertical pump cylinders 46 which are provided with pump pistons 47. Each cylinder 46 is provided with an inlet check 48 (see Figs. 6 and 7) and with an outlet check 49, the two checks 49 being in communication with a longitudinally bored body 50 to which a liquid-conducting line 51 is coupled, said line 51 extending out of the reservoir 45 and being in communication with the cylinder of the cylinder-and-piston-assembly. In most views, the line 51 connects with the central portion of the cylinder 32. In Fig. 9, to be later described, however, the line 51 is branched at 51ª and communicates with the ends of the cylinder 32ª.

When the pumps are operated, they force liquid from the reservoir 45 into the cylinder to operate the pistons in frame-raising direction. The body 50 is provided with a valve 52 which is normally closed, said valve 52, however, having means 53 whereby it may be opened, said means extending to the exterior of the reservoir 45. When this means 53 is opened to effect opening of the valve 52, liquid may bleed from the cylinder through the line 51 and back into the reservoir 45, releasing both pistons from the action of the liquid and permitting the frame to lower by gravity.

In the present disclosure, each pump piston 47 is provided with a rocker 54 by means of which it may be reciprocated, and I provide hand levers 55 for actuating said rockers. These hand levers, as most clearly shown in Figs. 6 and 7, are slidably connected with the rockers 54 to move from the operative positions shown in full lines in Figs. 2 and 8, to the retracted positions shown in dotted lines in Fig. 2, whereby said levers may be extended for convenient and efficient operation when it is desired to raise the frame, but may be moved to the out-of-the-way positions during movement of the vehicle from one point to another.

If desired, either instead of the hand-actuated pumps, or in addition thereto, a pump 56 driven by an appropriate motor 57, may be provided, a battery to supply current to the motor, being illustrated at 58 (see Fig. 8). An intake for the pump 56 is illustrated at 59, and the pump outlet 60, of course, communicates with the line 51 above described. A cutoff valve 61 is provided in the outlet 60 to be closed when the hand pumps are to be used.

In Fig. 9, the liquid for piston operation is admitted between the piston heads 35ª and the stuffing boxes 36ª at the ends of the cylinder 32ª, and the piston rods 35ᵇ are directly connected to chains 41ᵇ which are secured to the segments 17.

From the foregoing, taken in connection with the accompanying drawings, it will be seen that novel and advantageous provision has been made for carrying out the objects of the invention, and while preferred features have been shown, attention is again invited to the possibility of making variations within the scope of the invention as claimed.

What is claimed is:

1. A wheeled vehicle comprising a frame, front and rear axles rotatably connected with said frame, wheels mounted on said axles, the axes of said wheels being offset from the axes of said axles to act as frame-raising cranks upon axle rotation in one direction and as frame-lowering cranks upon axle rotation in the other direction, a cylinder-and-piston-assembly mounted horizontally on said frame and operatively connected with said axles to cause frame-raising rotation of said axles, a liquid reservoir mounted on said frame, means for pumping liquid from said reservoir into the cylinder of said assembly to operate the latter and rotate said axles to raise said frame, and valved means for bleeding liquid from said cylinder to said reservoir to allow frame-lowering rotation of said axles.

2. A wheeled vehicle comprising a frame, front and rear axles rotatably connected with said frame, wheels mounted on said axles, the axes of said wheels being offset from the axes of said axles to act as frame-raising cranks upon axle rotation in one direction and as frame-lowering cranks upon axle rotation in the other direction, segments secured to said axles, a cylinder-and-piston-assembly mounted horizontally on said frame, pull members having flexible portions secured to said segments, said members being operatively connected with said cylinder-and-piston-assembly, a liquid reservoir mounted on said frame, means for pumping liquid from said reservoir into the cylinder of said assembly to operate the latter and pull upon said pull members, causing said pull members and said segments to rotate said axles and raise said frame, and valved means for bleeding liquid from said cylinder to said reservoir to allow frame-lowering rotation of said axles.

3. A wheeled vehicle comprising a frame, front and rear axles rotatably connected with said frame, wheels mounted on said axles, the axes of said wheels being offset from the axes of said axles to act as frame-raising cranks upon axle rotation in one direction and as frame-lowering cranks upon axle rotation in the other direction, segments secured to said axles, a cylinder-and-piston-assembly mounted on said frame and disposed longitudinally thereof between said axles, said assembly having two oppositely movable pistons, pull members having flexible portions secured to said segments, said pull members extending longitudinally of said frame and being operatively connected with said pistons, a liquid reservoir mounted on said frame, means for pumping liquid from said reservoir into the cylinder of said cylinder-and-piston-assembly to operate said pistons, said pull members, said segments and said axles to raise said frame, and valved means for bleeding liquid from said cylinder to said reservoir to allow frame-lowering rotation of said axles.

4. A wheeled vehicle comprising a frame, front and rear axles rotatably connected with said frame, wheels mounted on said axles, the axes of said wheels being offset from the axes of said axles to act as frame-raising cranks upon axle rotation in one direction and as frame-lowering cranks upon axle rotation in the other direction, segments secured to said axles, a cylinder mounted on said frame and disposed longitudinally thereof between said axles, front and rear pistons slidable in said cylinder and having portions projecting beyond the front and rear ends of said cylinder respectively, one fixed longitudinal guide track for the forwardly projecting portion of said front piston, a second fixed longitudinal guide track for the rearwardly projecting portion of said rear piston, said projecting piston portions having guide heads slidably engaged with said tracks respectively, one longitudinally extending pull member secured at its front end to said guide head of said front piston and having a flexible rear portion secured to the segment of said rear axle, a second longitudinally extending pull member secured at its rear end to said guide head of said rear piston and having a flexible front portion secured to the segment of said front axle, means for forcing a fluid into said cylinder between said pistons to operate said pistons, said pull members, said segments and said axles to raise said frame, and means for bleeding the fluid from said cylinder to allow frame lowering.

5. A wheeled vehicle comprising a frame having longitudinal side members, end members secured to said side members and two closely spaced longitudinal bars near the longitudinal center of the frame and secured to said end members; wheels for supporting said frame, means mounting said frame on said wheels for vertical adjustment, and hydraulic means for raising and lowering said frame including a cylinder-and-piston-assembly mounted between said closely spaced longitudinal bars and secured thereto.

6. A wheeled vehicle comprising a frame having longitudinal side members, end members secured to said side members, and two closely spaced longitudinal bars near the longitudinal center of the frame and secured to said end members; wheels for supporting said frame, means mounting said frame on said wheels for vertical adjustment, and hydraulic means for raising and lowering said frame, including a cylinder-and-piston-assembly and a liquid reservoir both mounted between said closely spaced longitudinal bars and secured thereto.

7. A wheeled vehicle comprising a frame having longitudinal side members, end members secured to said side members, and two closely spaced longitudinal bars near the longitudinal center of the frame and secured to said end members; wheels for supporting said frame, means mounting said frame on said wheels for vertical adjustment, and hydraulic means for raising and lowering said frame, said hydraulic means including a cylinder disposed longitudinally between said closely spaced longitudinal bars and having lateral supporting lugs secured thereto, said supporting lugs having openings, longitudinal pull members between said closely spaced longitudinal bars and passing slidably through said openings of said supporting lugs, pistons in said cylinder having portions projecting beyond the ends thereof, guide heads on said projecting piston portions, and longitudinal guide tracks engaged with said guide heads and secured to said closely spaced longitudinal bars, said pull members being secured to said guide heads.

8. A wheeled vehicle comprising a frame having longitudinal bars and transverse frame members to which the ends of said longitudinal bars are secured, and top and bottom plates cooperating with said longitudinal bars and said transverse frame members in forming a casing; wheels for supporting said frame, means mounting said frame on said wheels for vertical adjustment, and hydraulic means for vertically adjusting said frame, said hydraulic means including a cylinder-and-piston-assembly and a liquid reservoir both confined within the casing formed by said longitudinal bars and transverse members.

9. A wheeled vehicle comprising a frame having a longitudinal tunnel and segment casings at the ends of said frame in communication with the ends of said tunnel, axles rotatably mounted on the ends of said frame, wheels connected with said axles and arranged to raise said frame when said axles are rotated in one manner and to lower said frame when said axles are rotated in another manner, segments secured on said axles within said segment casings, a hydraulic cylinder-and-piston-assembly mounted longitudinally within said tunnel, means operatively connecting said hydraulic means with said segments, and means for forcing a liquid into said hydraulic cylinder-and-piston-assembly or bleeding it therefrom according to the manner in which said axles are to be rotated.

10. A wheeled vehicle comprising a frame having a longitudinal tunnel and segment casings at the ends of said frame in communication with the ends of said tunnel, axles rotatably mounted on the ends of said frame, wheels connected with said axles and arranged to raise said frame when said axles are rotated in one manner and to lower said frame when said axles are rotated in another manner, segments secured on said axles within said segment casings, hydraulic segment-turning means mounted longitudinally within said tunnel, means operatively connecting said hydraulic means with said segments, a liquid reservoir also mounted in said tunnel, and means for pumping liquid from said reservoir into said hydraulic means or for bleeding liquid from said hydraulic means into said reservoir, according to the manner in which said axles are to be rotated.

11. In a wheeled vehicle, a frame having longitudinal side bars and a transverse end member secured at its ends to said side bars, alined bearings fixedly carried by the ends of said end member, a segment casing fixedly carried by the intermediate portion of said end member, an axle mounted rotatably in said bearings and extending through said segment casing, a segment secured on said axle within said segment casing, means connected with said segment for rotating said axle, and wheels connected with said axle, the wheel axis being offset from the axle axis to effect raising or lowering of said frame according to the direction in which said axle is rotated.

12. A four-wheeled gun carriage comprising a frame, a front axle and a rear axle rotatably mounted at the ends of said frame, means including wheel spindles at each end of said axles, said wheel spindles being offset from the line of said axles, wheels upon said spindles, said offset being such that when said axles are rotated to bring the wheels in normal position said frame is off the ground for traveling and when said axles are rotated to bring the wheels in raised position said frame is on the ground for firing, means for locking said axles and wheels in both positions, hydraulic means mounted longitudinally in said frame, a segment mounted on each axle, means connecting said hydraulic means with said segments, a liquid reservoir mounted on said frame, a pump mounted on said frame and in communication with said reservoir, means including a valve connecting said pump with said hydraulic means, a second and normally closed valve in said reservoir and communicating with said hydraulic means, said second valve being provided with means whereby it may be opened, said pump being adapted to force liquid from said reservoir through the first mentioned valve into said hydraulic means and said second valve being adapted to bleed liquid, when opened, from said hydraulic means into said reservoir.

13. A mobile anti-aircraft gun mount comprising a horizontal frame, front and rear axles rotatably connected with said frame, front and rear pairs of wheels mounted on said axles, the axes of the wheels being offset from the axes of the axles to act as frame raising and frame lowering cranks upon axle rotation, and means on said frame operatively connected with said front and rear axles for simultaneously rotating said front and rear axles in opposite directions to lower the frame from traveling position above the ground to service position upon the ground and vice versa, said axle-rotating means having such elements that the frame-lowering rotations of said axles swing said front wheels forwardly and upwardly with respect to said frame and said rear wheels rearwardly and upwardly with respect to said frame, whereby maximum cleared space on top of said frame is provided for gun operation when said frame is lowered and a minimum wheel base for maneuverability is provided when said frame is raised.

BRYAN P. JOYCE.